Sept. 7, 1943.　　　　　G. D. GULER　　　　　2,328,974
AIR CONDITIONING SYSTEM
Filed Jan. 30, 1941
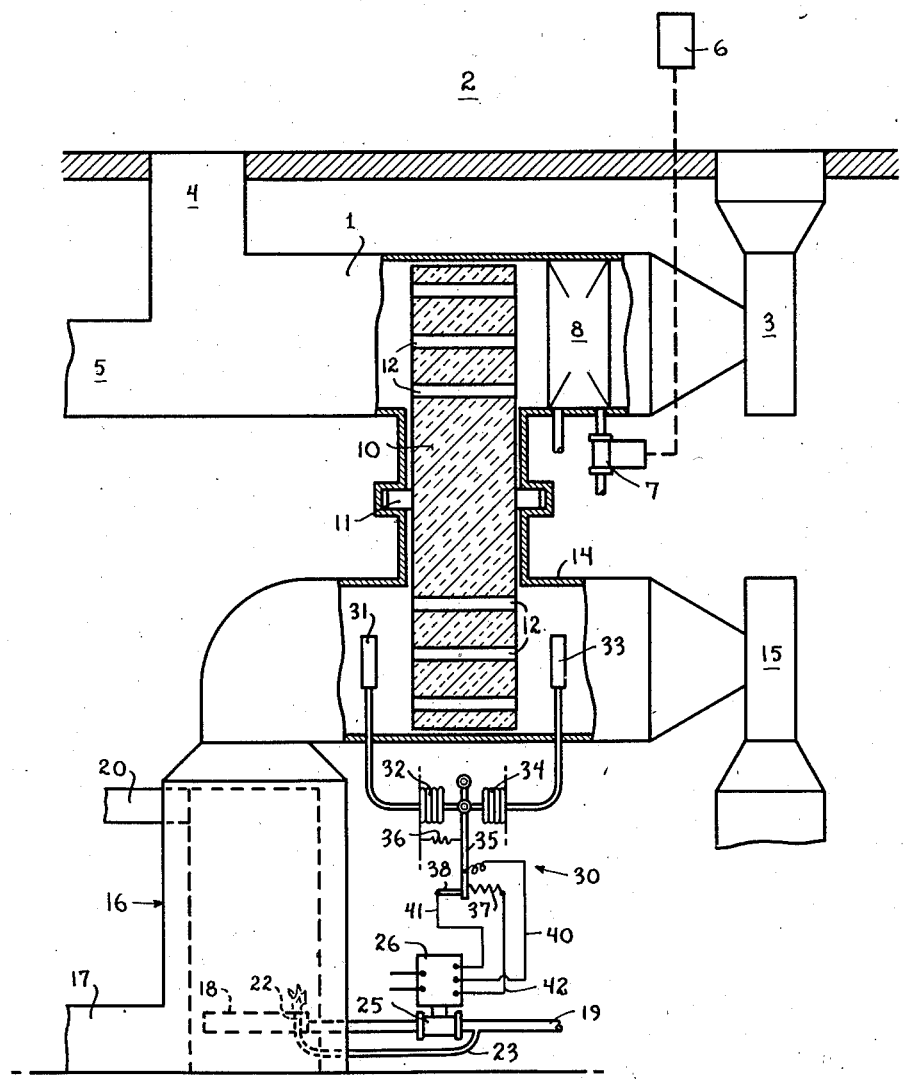
INVENTOR
George D. Guler
BY George H. Fisher
ATTORNEY Patented Sept. 7, 1943

2,328,974

UNITED STATES PATENT OFFICE 2,328,974

AIR CONDITIONING SYSTEM

George D. Guler, White Plains, N. Y., assignor to Minneapolis-Honeywell Regulator Company, Minneapolis, Minn., a corporation of Delaware Application January 30, 1941, Serial No. 376,621

6 Claims. (Cl. 183—4)

This invention relates to an air conditioning system and more particularly to a system for air conditioning wherein dehumidification of the air is a requisite to satisfactory conditioning of a space.

This invention is more particularly directed to a control system for use in an air conditioning system wherein dehumidification of the air is effected by passing the air over a suitable dehumidifying means which may be in the form of a freely rotatable wheel mounted upon a horizontal axis, the air to be dehumidified passing through the upper portion of the wheel and a flow of heated air being passed through the lower portion of the wheel for driving off moisture which has been absorbed thereby.

A difficulty experienced with such dehumidifying wheels has been caused by overheating the wheel when only a minimum amount of dehumidification is needed. Inasmuch as such wheels are usually employed in a cooling system this extra heat additionally loads the cooling means and thereby increases the cost of operating the system. In other instances the wheel may be overheated to such an extent that the hygroscopic material making up the wheel may become cracked or powdery. In still other instances the heat supply to the wheel can only be so proportioned to the average dehumidifying load that upon high load conditions not sufficient moisture will be driven from the wheel and upon minimum load conditions the wheel will become overheated.

It is an object of this invention to provide an improved means for controlling the reactivation of a dehumidifying wheel of the kind described to obviate the above mentioned difficulties.

It is a further object of this invention to provide a control means for an air conditioning system including dehumidifying means of the kind described above and correlating the operation of the dehumidifying means and the control means.

Other objects and advantages will become apparent upon the study of the specification, claims, and appended drawing wherein the single figure is a schematic diagram of an air conditioning system incorporating the novel controlling means.

Referring more particularly to the drawing an air conditioning chamber 1 is adapted to condition air delivered to a space 2 by a fan 3. The air from the space 2 returns to the conditioning chamber through a duct 4. The returning air may be suitably mixed in any conventional manner with fresh air supplied through a fresh air duct 5. The temperature of the space 2 is under the control of a space thermostat 6 which operates a valve 7 that controls a flow of conditioned medium to a conditioner 8. The conditioner in most instances will be a cooling coil supplied with a suitable cooling medium such as cool water, a refrigerant, or the like. However, in some instances it will be understood that the conditioner 8 may take the form of a suitable heater of any conventional type.

A dehumidifying means is also arranged within the chamber 1 and may take the form of a wheel 10 composed of hygroscopic material such as silica gel, or the like. The wheel 10 is mounted upon a horizontal axis 11 having antifriction bearings, not shown. The wheel 10 has apertures 12 therethrough to offer a greater area to the passing air. This wheel may take the form of that disclosed by Roger S. Kopp in Patent 2,115,226.

A drying means for the dehumidifying wheel 10 is located below the conditioning chamber 1 so that a lower portion of the wheel will pass therethrough. The drying means includes a duct 14 and a fan 15 for drawing air therethrough. This air is warmed in a heater 16 which is shown as a hot air type of heater. It will be understood that other types of heaters might be utilized such as, for example, steam or hot water heat, an electric heater, a refrigerant condenser, or some other known means of heating. The air is drawn past the heater 16 from a supply duct 17 through the reactivating chamber 14 by the fan 15. The heater comprises a suitable burner 18 supplied with some suitable fluid fuel, such as gas, through a pipe 19. The exhaust gases escape from the heater through a flue 20. A pilot burner 22 is connected to the gas supply line 19 by a pipe 23. The pilot is adapted to light the main burner whenever the main gas valve 25 is initially opened to supply fuel to the burner 18.

The valve 25 is adapted to be positioned by a suitable proportioning motor 26. This motor 26 may be of the type shown in Patent 2,028,110 issued to D. G. Taylor January 14, 1936. The motor 26 is controlled by a suitable control device generally indicated by the reference character 30.

The control device 30 comprises a first thermostatic bulb 31 which, upon temperature variations, is adapted to expand or contract the thermostatic fluid contained therein to cause a bellows 32 to expand and contract. A second bulb 33, similar in all respects to the bulb 31, is adapted to expand and contract a bellows 34 in accordance with temperature changes at the bulb 33. While bellows 32 and 34 have been shown, it will be clearly understood that other suitable expansible and contractible means such as diaphragms, for example, could be used. The bellows 32 and 34 coact upon a pivoted arm 35. The arm 35 is biased by an adjustable spring 36 in one direction. The arm 35 is positioned by the conjoint action of the bellows 32 and 34 along a resistance element 37. It will be obvious that as the temperature difference between the two bulbs 31 and 33 varies, the position of the arm will be varied along the resistance element 37. For example, if the temperature at bulb 31 is higher than the temperature at bulb 33 the arm 35 will be moved toward the right along resistance 37. When the temperature at bulb 33 approaches the same value as the temperature at bulb 31 the arm 35 will be moved toward the left by the action of the spring 36. When these temperatures are equal the slider arm 35 is adapted to slide onto a bar portion 38 of the resistance element 37, as shown. The slider arm 35 is connected to the proportioning motor 26 by a conductor 40. The bar portion 38 of the resistance element is connected to the proportioning motor 26 by the conductor 41 and the right end of the resistance 37 is connected to the proportioning motor 26 by the conductor 42.

It will be seen upon a study of the aforementioned Taylor patent that as the slider arm 35 moves towards the right on the resistance element 37 the valve will be positioned in an amount corresponding to this movement. In the present invention the valve is adapted to be in closed position, or in some instances in minimum position, when the slider arm 35 is in engagement with the bar portion of the resistance element 38. As the arm 35 is progressively moved further and further toward the right upon the resistance element 37 the valve 25 is adapted to be opened more and more by the proportioning motor 26. Conversely as the arm 35 moves further to the left along the resistance 37 the valve 25 is adapted to be more and more closed by the proportioning motor 26.

*Operation*

Upon a study of the aforementioned Kopp patent it will be noted that moisture is absorbed in the upper portion of the wheel. This moisture is driven off by the drying action of the drying means at the lower portion of the wheel. The cooperative action of picking up and driving off moisture causes the wheel to be rotated by the weight of the absorbed moisture. As more moisture is absorbed in the upper part of the wheel, more moisture will be driven off in the lower part of the wheel. As more moisture is driven off there will be a greater temperature difference across the drying portion of the wheel 10 because the heated air will give up more heat due to the increase of evaporation. The temperature bulbs 31 and 33 will respond to this temperature difference. As the difference increases, indicating a higher moisture content in the wheel 10, the fuel valve 25 should be moved toward opened position so as to supply more heat to the drying air. Conversely as the temperature difference decreases, indicating a smaller moisture content in the wheel 10, the fuel valve 25 should be moved toward closed position so as to supply less heat to the drying air.

In the position shown the control device 30 causes the valve 25 to be in closed position. Such a control position will be assumed under minimum drying load conditions. In other words, when the drying air is of such temperature that it will drive off sufficient moisture from the wheel to keep the wheel dried to a desired extent to take care of the minimum dehumidifying load, the burner 18 may be placed out of operation. Upon an increase in pick-up of moisture in the upper portion of the wheel the warm air being circulated across the lower portion thereof will absorb more moisture and will have an increased temperature difference. The air entering the wheel will be at a given warm temperature and because of giving up heat of absorption to the wheel the air leaving the wheel will be at a lower temperature. This temperature difference will be sensed by the thermostatic bulbs 31 and 33. The difference in temperature will cause the bellows 32 responsive to the warmer temperature bulb 31 to exert a greater force than that exerted by the bellows 34 which responds to the temperature bulb 33. This difference in force between the bellows 32 and 34 will cause the contact arm 35 to be moved toward the right along the resistance 37. Such movement toward the right of the arm 35 along the resistance 37 will cause the total resistance between the conductors 40 and 42 to be decreased with respect to that portion between conductors 41 and 42 to thereby cause the motor to open the valve an amount corresponding to the change in position of the resistance arm 35 upon the resistance 37. The opening of the valve 25 will cause the burner 18 to be started up thus warming the air supplied to the dehumidifying wheel 10 still more. The warmer air now circulated across the drying portion of the wheel will cause the drying air to drive more moisture from the lower portion of the wheel. In like manner, for each increase in the dehumidifying load, the fuel valve 25 will be opened further.

Assume now that the slider arm 35 is moved to the extreme right hand position along the resistance element 37 to the position it would assume under the maximum dehumidifying load demand. Now if less moisture were picked up in the upper portion of the wheel, there would be less moisture necessarily driven out from the lower portion of the wheel, and hence, the temperature difference between the temperature bulbs 31 and 33 will decrease. On a decrease in the temperature differential, the pressure exerted by the bellows 34 would more nearly approach the pressure exerted by the bellows 32 whereupon the slider arm 35 would be moved toward the left by the action of the spring 36. When the slider arm 35 moves to the left on the resistance 37, the valve 25 will be closed by the proportioning motor 26 to a degree corresponding to this movement. When the valve 25 is closed down a certain extent, less heat will be supplied to the drying air passing through the lower portion of the dehumidifying wheel. As the demand for dehumidification decreases further, the slider arm 35 will be correspondingly moved more and more toward the left along the resistance 37 until some suitable minimum position may be assumed wherein the valve 25 is either in a minimum heating position, or in the "off" position under certain circumstances where the air supply to the lower portion of the wheel is normally above the minimum drying temperature.

While I have described one form which my invention may take, it will be apparent that other temperature responsive means or condition responsive means might be utilized in connection with the novel control means which act in accordance with different temperature differentials across a portion of the wheel. For example, in accordance with the teachings of the present invention, it would be obvious to place the differential controller at some other portion of the wheel. Many other modifications and adaptations of the present invention will occur to those skilled in the art, therefore, it should be clearly understood that the invention is not to be limited only to that form shown and described but by the scope of the appended claims.

I claim as my invention:

1. In an air conditioning system, air conditioning means, means for circulating air over said air conditioning means and through a space to be conditioned, said air conditioning means comprising a member of moisture absorbing material arranged to present continuously different surfaces thereof to the flow of air, reactivating means including heating means and fan means for circulating heated air to drive moisture from a portion of said member which is not exposed to the flow of space conditioning air, said reactivating function causing the heated air to give up heat to said member and to the moisture driven therefrom, first control means responsive to the temperature of the heated air before reaching said member, second control means responsive to the temperature of the heated air after leaving said member, and means mechanically connecting said first and second control means for controlling the heat content of said air by the simultaneous action of said first and second control means.

2. In an air dehumidifying system comprising a dehumidifying material arranged to present continuously different surfaces thereof to an air stream to be conditioned and to a heated air stream having a substantially constant rate of flow to reactivate the material, the combination of, control means responsive to the temperature difference of said heated air streams before and after passing said material, and means for controlling the heat content of said heated air stream in response to said temperature difference.

3. In an air dehumidifying system comprising a dehumidifying material arranged to present continuously different surfaces thereof to an air stream to be conditioned and to a heated air stream having a substantially constant rate of flow to reactivate the material, the combination of, control means responsive to the temperature of said heated air stream before and after passing said material, electrically operated proportioning means connected to said control means and positioned by said control means in proportion to the difference between said temperatures, and heating means controlled by said proportioning means for regulating the heat content of the heated air.

4. In an air dehumidifying system comprising a dehumidifying material arranged to present continuously different surfaces thereof to an air stream to be conditioned and to a heated air stream to reactivate the material, the combination of, first control means responsive to the temperature of the heated air before reaching said material, second control means responsive to the temperature of the heated air after passing said material, and means for controlling the heat content of said air by the simultaneous action of said first and second control means in response to the said temperature existing at the same instant of time.

5. In an air dehumidifying system comprising a dehumidifying material arranged to present continuously different surfaces thereof to an air stream to be conditioned and to a heated air stream to reactivate the material, the combination of, a first temperature responsive fluid filled bulb in the heated air stream upstream of said material, a second temperature responsive fluid filled bulb in the heated air stream downstream of said material, a pair of expansible members arranged to oppose each other, one of said members being in fluid communication with said first bulb and the other being in fluid communication with said second bulb, a control member actuated by the conjoint action of said pair of expansible members in accordance with temperature changes at said first and second bulbs, and means for controlling the heat content of said heated air stream by said control member.

6. In an air conditioning system comprising a member of moisture absorbing material arranged to present continuously different surfaces to a flow of air to be conditioned and to a stream of heated air having substantially constant rate of flow to drive moisture from a portion of said member, the combination of, heating means for heating the air supplied to said portion of said member, first and second control means simultaneously responsive to the temperature difference across said portion, and mechanical connecting means between said first and second control means whereby said first and second control means jointly regulate the heat output of said heating means in response to said difference in temperature.

GEORGE D. GULER.